(12) United States Patent
Mills et al.

(10) Patent No.: US 11,176,858 B2
(45) Date of Patent: Nov. 16, 2021

(54) INTEGRITY MONITORING OF A DISPLAY SYSTEM

(71) Applicant: BAE SYSTEMS plc, London (GB)

(72) Inventors: Colin Richard Mills, Rochester (GB); Ian Thomas Macken, Rochester (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 16/761,042

(22) PCT Filed: Nov. 6, 2018

(86) PCT No.: PCT/GB2018/053222
§ 371 (c)(1),
(2) Date: May 1, 2020

(87) PCT Pub. No.: WO2019/092413
PCT Pub. Date: May 16, 2019

(65) Prior Publication Data
US 2020/0349874 A1 Nov. 5, 2020

(30) Foreign Application Priority Data
Nov. 13, 2017 (GB) ...................... 1718703

(51) Int. Cl.
G09G 3/00 (2006.01)
G02B 27/01 (2006.01)
G06T 7/00 (2017.01)

(52) U.S. Cl.
CPC ......... *G09G 3/006* (2013.01); *G02B 27/0101* (2013.01); *G06T 7/0002* (2013.01);
(Continued)

(58) Field of Classification Search
CPC ........ G09G 3/006; G09G 3/003; G09G 3/002; G09G 2320/029; G09G 2320/0693;
(Continued)

(56) References Cited

U.S. PATENT DOCUMENTS 7,355,179 B1 * 4/2008 Wood ...................... G06T 1/00
250/339.11
2008/0252489 A1 * 10/2008 Naimer ................ G01C 23/005
340/971

(Continued)

FOREIGN PATENT DOCUMENTS

CN 201489795 U * 5/2010
CN 201489795 U * 5/2010

(Continued)

OTHER PUBLICATIONS

International Preliminary Report on Patentability received for PCT Application No. PCT/GB2018/053222, dated May 28, 2020. 10 pages.

(Continued)

*Primary Examiner* — Brent D Castiaux
(74) *Attorney, Agent, or Firm* — Finch & Maloney PLLC

(57) ABSTRACT

There is provided an integrity monitor for a display system, the display system comprising an image source and a display. The integrity monitor comprises a controller configured to analyse sensed characteristics at one or more predetermined positions in an image area of the display system and to relate the sensed characteristics to predetermined characteristics of a stimulus, when injected into the system, thereby to determine the presence of a fault in the (Continued)

system. The sensed characteristics may be sensed optically or non-optically. The stimulus may be optical or non-optical.

20 Claims, 7 Drawing Sheets

(52) U.S. Cl.
CPC .................. *G02B 2027/014* (2013.01); *G02B 2027/0112* (2013.01); *G02B 2027/0138* (2013.01); *G09G 2320/029* (2013.01); *G09G 2360/145* (2013.01); *G09G 2380/12* (2013.01)

(58) Field of Classification Search
CPC ......... G09G 2360/145; G09G 2380/12; G09G 2330/12; G09G 2340/0464; G09G 2340/12; G02B 27/0101; G02B 27/017; G02B 27/01; G02B 2027/0112; G02B 2027/0138; G02B 2027/014; H04N 17/004; G06T 7/0002
See application file for complete search history.

(56) References Cited

U.S. PATENT DOCUMENTS

| 2010/0067095 | A1* | 3/2010 | Fulton | .................. G02B 27/01 359/292 |
| 2016/0112702 | A1 | 4/2016 | Qian et al. | |

FOREIGN PATENT DOCUMENTS

| CN | 102081895 A | 6/2011 |
| CN | 105301810 A | 2/2016 |
| EP | 2346251 A1 | 7/2011 |
| JP | 2007251555 A | 9/2007 |
| WO | 2019092413 A1 | 5/2019 |

OTHER PUBLICATIONS

International Search Report and Written Opinion received for PCT Application No. PCT/GB2018/053222, dated Jan. 16, 2019. 42 pages.
GB Search Report under Section 17(5) received for GB Application No. 1718703.0, dated May 14, 2018. 4 pages.

* cited by examiner

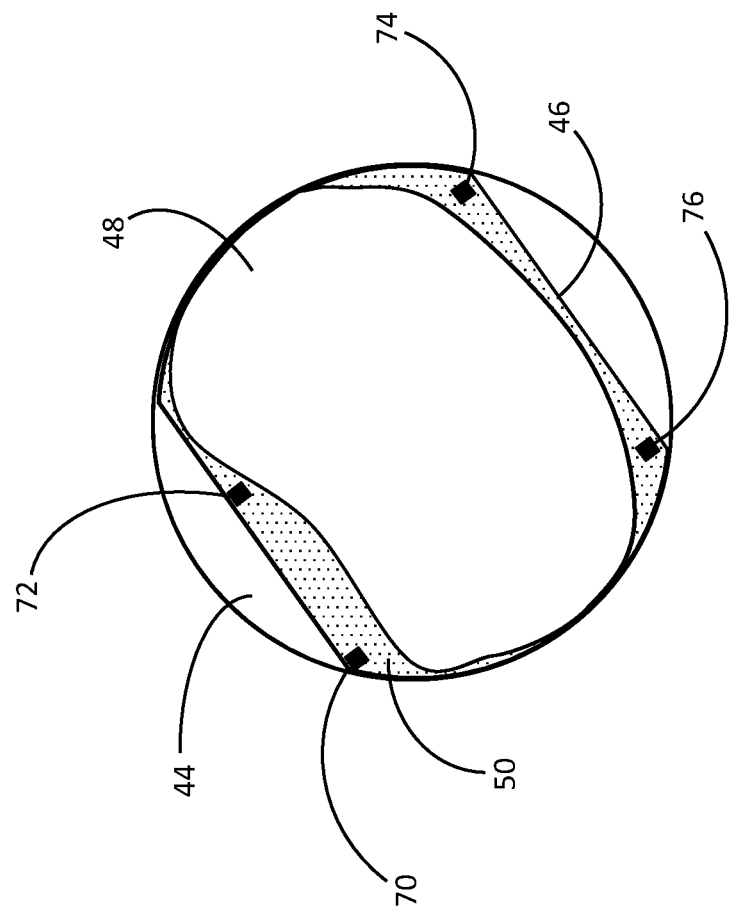
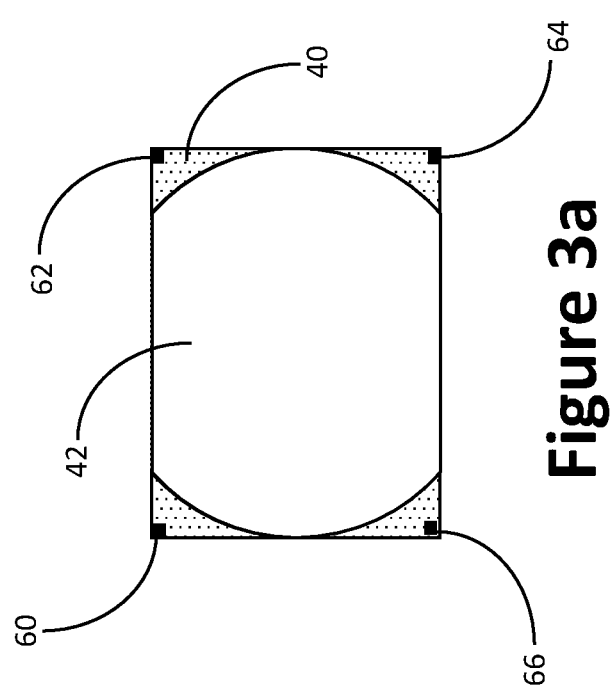
Figure 3b
Figure 3a

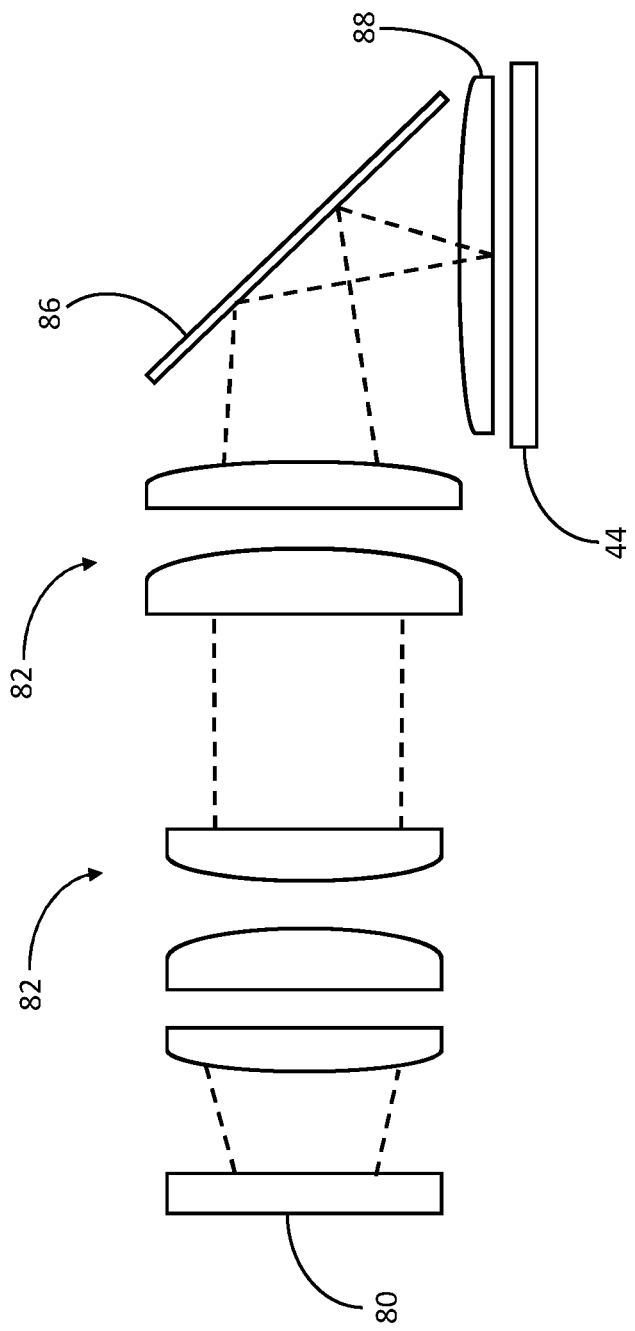

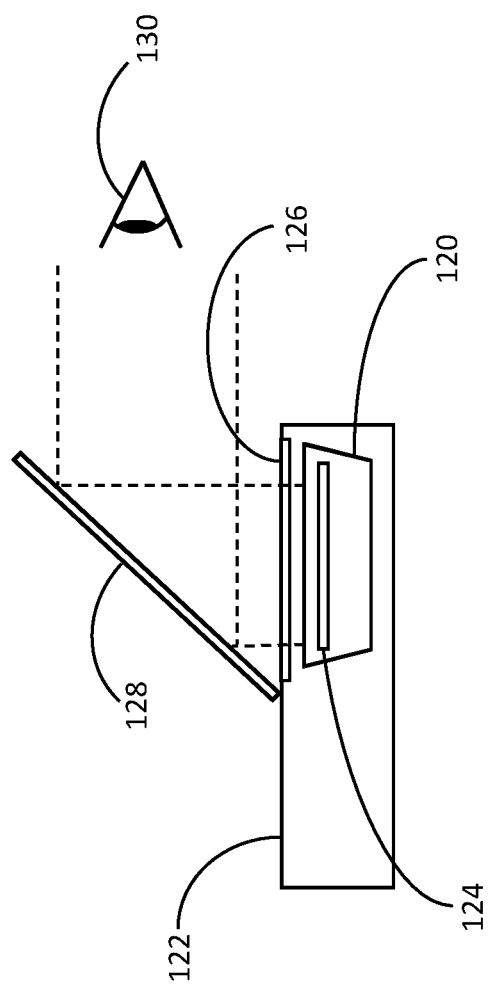

INTEGRITY MONITORING OF A DISPLAY SYSTEM

FIELD OF THE INVENTION

This invention relates to integrity monitoring and, in particular but not exclusively, to integrity monitoring of display systems.

BACKGROUND

Avionic displays, in particular those required to display safety-critical information, are required to operate with a very high level of integrity and to have been developed to very high standards associated with integrity.

Certification of such systems may be very expensive and time-consuming.

SUMMARY OF THE INVENTION

According to a first aspect disclosed herein, there is provided an integrity monitor for a display system, the display system comprising an image source and a display, the integrity monitor comprising a controller configured to analyse sensed characteristics at one or more predetermined positions in an image area of the display system and to relate the sensed characteristics to predetermined characteristics of a stimulus, when injected into the system, thereby to determine the presence of a fault in the system.

In an example, the stimulus comprises an optical stimulus having predetermined characteristics for injection into an optical sensor of the display system. Injecting an optical stimulus enables the full functionality of the optical sensor to be exercised.

In an example, the integrity monitor comprises an optical injection source arranged to generate an optical stimulus comprising light having predetermined characteristics of wavelength, brightness and duration. The optical injection source may operate to generate an optical stimulus having predetermined characteristics. Alternatively, in an example, the optical injection source is controllable by the controller.

In an example, the integrity monitor comprises one or more optical fibres for channelling light from the optical injection source to one or more positions in an image sensing area of the optical sensor. In an alternative example, the integrity monitor comprises an optical waveguide positioned to output light including an optical stimulus to the optical sensor.

In an example, the display system comprises a generator of symbols for display. Optionally, the generator of symbols is configured to generate a stimulus comprising one or more symbols, each at a predetermined position within an image area of the system. Symbols may comprise lines and shapes such a triangles, circles or squares, together with alphanumeric characters or data represented in various ways.

In an example, the stimulus comprises a manipulation of data representing an image area in the system. The data representing an image area of the system may for example comprise image data defining pixel brightness or colour for each pixel in an image area of the display.

In an example, the stimulus comprises an inherent noise component, generated by a component of the system, in data representing an image area of the system. A noise component may arise for example due to noise inherent in an optical sensor of the display system or in electronics of the display system, or due to induced noise.

In an example, the integrity monitor comprises an optical detector for sensing characteristics of light emitted at one or more predetermined positions in an image area of the display and for outputting data indicative of the sensed characteristics to the controller.

In an example, the integrity monitor comprises one or more optical fibres for channelling light emitted at the one or more predetermined positions to the optical detector, wherein the one or more predetermined positions are outside of the field of view of a user of the display. In this way, integrity monitoring may be performed without disturbing the user's normal use of the display.

In an example, the integrity monitor comprises an optical waveguide positioned within an image projector of the display to capture a portion of collimated light in the image area of the display and to channel the captured light to an image sensor, thereby to provide image data to the controller for analysis. Use of an optical waveguide and associated image sensor enables a more sophisticated analysis of sensed light emitted at particular positions within the image area of the display without being constrained by sensing light emitted only at fixed positions within the image area of the display.

In an example, the controller is configured to identify, from sensed changes to light emitted from the one or more predetermined positions in the image area of the display over a predetermined time period, whether the display has frozen or whether image elements being displayed are subject to an undesirable oscillation.

In an example, the controller is configured to receive data representing an image area in the system and to determine a position, represented in said data, corresponding to the one or more predetermined positions in the image area of the display such that a stimulus comprising a manipulation of said data for said determined position is expected to result in a change in sensed characteristics at the one or more predetermined positions in the image area of the display. By this technique, precise positioning of optical fibres, for example, to capture light emitted at fixed positions in the image area of the display may be avoided. Instead, the controller, or functionality implemented within the display system, is able to determine, by manipulating data, which position represented in the data would be expected to result in a sensed change in characteristics of light emitted at the one or more predetermined positions in the image area of the display.

In an example, the controller is configured to receive data representing an image area in the system and to determine a position, represented in said data, corresponding to the one or more positions in the image sensing area of the optical sensor at which an optical stimulus may be injected. By this technique, precise positioning of optical fibres, for example, to inject an optical stimulus at fixed positions in the image sensing area of an optical sensor may be avoided. Instead, the controller is able to determine, by analysing data representing the image area in the system, a position in the image area at which the optical stimulus has been sensed.

In an example, the controller is configured to inject a stimulus or to redirect an injected stimulus by a manipulation of data representing an image area in the system such that the injected stimulus is expected to result in a change in sensed characteristics at the one or more predetermined positions in the image area of the display. In this way, the controller is able to adjust for imprecise positioning either of a source of an optically-injected stimulus or of a detector of light emitted at particular positions in the image area of the display.

In an example, the display is arranged to display colour or multiple wavelength images and the controller is configured to determine from expected colour or wavelength characteristics of an injected stimulus sensed at the one or more predetermined positions in the image area of the display whether there has been a failure of an LED in an image projector of the display. The colour may include an infra-red component generated by an infra-red LED.

In an example application, the display comprises one or more of a head or helmet-mounted display, a head-up display or a head-down display.

According to a second aspect disclosed herein, there is provided a method for monitoring integrity of a display system, comprising analysing sensed characteristics at one or more predetermined positions in an image area of the display system and relating the sensed characteristics to predetermined characteristics of a stimulus when injected into the system, thereby to determine the presence of a fault in the system.

DESCRIPTION OF THE DRAWINGS

Example embodiments of the present invention will now be described, by way of example only, with reference to the accompanying drawings of which:

FIG. 3 shows an example of an optical or non-optical stimulus and how it may be positioned in an image area shown in FIG. 2, according to an example disclosed herein;

FIG. 4 shows schematically a sectional view of components of an example image projector for a helmet-mounted display, according to an example disclosed herein;

FIG. 7 shows schematically a sectional view of components of an example HUD to which examples disclosed herein may be applied.

DETAILED DESCRIPTION

Figure 1:
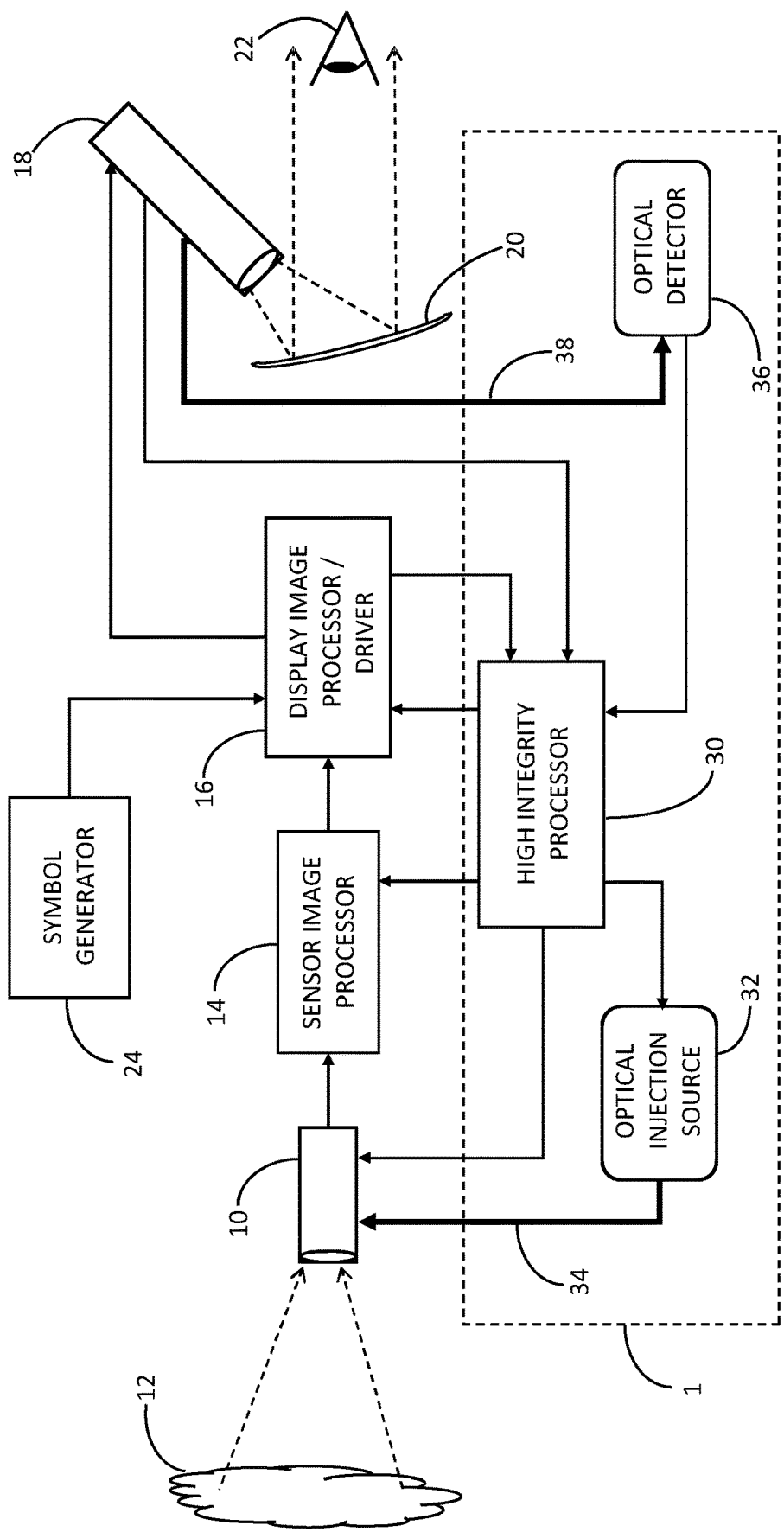
FIG. 1 shows example components of a display system incorporating an integrity monitoring system according to an example disclosed herein.

Certification of avionic displays, in particular those required to display safety-critical information, requires evidence of development to very high standards of integrity and operation to a very high level of integrity.

An approach to ensuring that avionic displays at least operate to a required level of integrity is to provide an independent integrity monitoring function. The integrity monitoring function may be developed and may operate in accordance with the highest required level of integrity. However, being a relatively simple arrangement in comparison with a typical end-to-end display system, certification of the integrity monitoring functionality to the highest standard may be easier to achieve.

Examples of an integrity monitor will be described below in an example application to display systems. In a particular example, the integrity monitor will be described for monitoring the integrity of a display system arranged to display images output by a night vision camera (NVC) in combination with symbols or other display artefacts displayed overlain upon NVC images. However, it will be clear that the principles to be described may be applied to monitoring the integrity of other types of display system or other types of safety-critical system, as would be apparent to a person of ordinary skill in the relevant art.

Examples of an integrity monitor to be described operate on the principle that a known stimulus may be injected at an early stage in the display system, tailored to the detection of a particular known type of integrity failure or other hazard. A result of injecting the stimulus may then be detected at a later stage in the display system and the result compared with what may be expected. In addition, the effect of the stimulus may provide a basis for analysing output of the display system when looking for evidence of an integrity failure or other hazard.

As an alternative to the injection of a known stimulus, an existing stimulus of unknown form such as a noise signal arising within the system, may be exploited to detect at least some forms of display system failure or a potentially hazardous mode of operation, as will be discussed below.

In the example display system mentioned above, having as one of its image inputs an NVC, a known stimulus may ideally be injected optically at the NVC and detected optically at a display output of the system in order to exercise all the optical and electronic components of the end-to-end system. It would also be beneficial if the known stimulus may be injected and the effects subsequently detected without disturbing a user's normal viewing of images being displayed by the display system. That would enable the integrity monitoring function to operate continuously during normal operation of the display system.

Maintaining a direct relationship between an optically injected stimulus at a sensor input and an optically detected effect at a display output requires, in the absence of an alternative, high-precision alignment in the optical injection position(s) and the optical detection position(s). However, an example alternative approach that avoids the need for high precision alignment and assembly of optical injection and optical detection components will be described below.

Examples of integrity failures or other safety hazards that may be detected include: in a colour display, a failure of one or more of a red, green or blue LED; a frozen display; image scaling errors; image oscillation; positioning errors; and image brightness faults. Examples of the display types in which such failures or hazards may be detected include head-up displays (HUDs), head-down displays (HDDs) and head-mounted displays (HMDs). Images displayed by such systems may be output by display devices such as digital micro-mirror devices (DMDs), liquid crystal on silicon (LCoS) devices, organic light-emitting diode (OLED) devices or other digital display device types.

An example helmet-mounted display system will now be described with reference to FIG. 1 incorporating an integrity monitoring arrangement according to an embodiment of the present invention. In another example display system, to be discussed below, the display system may include a HUD in addition or in place of a helmet-mounted display.

Referring to FIG. 1, there is shown schematically an arrangement of components of a helmet-mounted display system comprising a night vision camera (NVC) 10 for sensing an external night-time scene 12, a sensor image processor 14, a display image processor/driver 16 and an image projector 18.

The image projector 18 is arranged to project an image towards and for reflection by a partially reflective visor 20 for viewing by a user 22.

The display system also includes a symbol generator 24 for generating image elements such as symbols and other data which may also be input to the display image processor/driver 16 for display. Symbols may comprise lines and shapes such a triangles, circles or squares, together with alphanumeric characters or data represented in various ways. The generated symbols would typically be displayed such that they appear to the user 22 to be overlain upon images supplied by the NVC 10, when in use.

In such a display system, failures may occur due to component failures or latent design failures in any one of the components 10, 14, 16, 18 and 24 leading to a potentially hazardous situation. An integrity monitoring arrangement 1 may be incorporated to work alongside the display system for the purpose of detecting such failures without interfering with the generation and display of images to the user 22. However, upon detection of a failure or other hazardous mode of operation, the integrity monitor may trigger an action, for example to disable the display system within a predetermined time period, e.g. 0.5 secs, of the failure first affecting what the user 22 sees displayed.

To this end, the integrity monitoring arrangement 1 comprises a high integrity processor 30 provided to implement integrity monitoring functionality of the arrangement 1. An optical injection source 32 is provided to generate light having predetermined characteristics. The optical injection source 32 may operate entirely according to a pre-configured sequence for generation of optical stimuli having the predetermined characteristics, requiring no link to the high-integrity processor 30. Alternatively, the optical injection source 32 may be controllable by the high-integrity processor 30 to trigger an optical stimulus or to generate a stimulus having specified characteristics. The generated light may be injected as an optical stimulus by means of an optical fibre 34 into the NVC 10. For example, the optical fibre 34 may inject light generated by the optical injection source 32 at an appropriate position within an optical system of the NVC 10. Ideally, the optical fibre 34 may inject light from a point close to a sensor in the NVC 10 so that the light may be detected by the sensor at an edge of its sensing area, outside of the field of view allowed by the optical system of the NVC 10. In that way, the injected light would not be expected to interfere with a view of the external scene 12 as may be displayed by the image projector 18 and viewed by the user 22. Example characteristics for the generated light will be discussed in more detail below.

The optical stimulus injected into the NVC 10 from the optical injection source 32, as for the light received via an optical system of the NVC 10 from the external scene 12, is detected by the sensor in the NVC 10 and corresponding signals or image data are output by the NVC 10 to the sensor image processor 14. Signal or image data are then passed to the display image processor/driver 14 which controls a display device of the image projector 18 to output a corresponding image. At least that part of the image that includes the view of the external scene 12 is projected by the image projector onto the visor 20 for viewing by the user 22. Where the optical stimulus is injected at an edge of the sensing area of a sensor in the NVC 10, the light generated by a display device within the image projector 18 should then be detectable from a corresponding position in the image area of the display device.

The integrity monitoring arrangement 1 includes an optical detector 36 arranged to sense the characteristics of light captured within the image projector 18, preferably from a point at which an image is formed within an optical system of the image projector 18. The light may be captured for example using an appropriately positioned optical fibre 38 or other optical arrangement, and channelled by the fibre 38 to the optical detector 36. The optical detector 36 outputs data representing the sensed light to the high integrity processor 30 for analysis, of which more detail will be provided below.

The application of an optical stimulus at the NVC 10 has the advantage that it enables all the functionality and hardware the NVC 10 to be tested. Similarly, the detection of an optical output enables the functionality and hardware of the image projector 18 to be tested along with all the components 14, 16 in between the NVC 10 and the image projector 18.

The high integrity processor 30 may also be arranged to introduce a non-optical stimulus comprising signals or data, or a manipulation of data at various points within the display system and to receive data from such points for monitoring purposes. For example, the high integrity processor 30 may modify data output by the NVC 10, representing an image area in the system, to overwrite data defining one or more groups of pixels at an edge of the image area. The modified pixels should then appear in image data being processed by the display image processor/driver 16 and subsequently in an image generated by the display device within the image projector 18. This technique provides an additional and more specific test of different parts of the display system, for example if it is not practical to inject an optical stimulus.

The high integrity processor 30 is also arranged to receive signals or data representing the image area at interfaces within one or both of the display image processor/driver 16 and the image projector 18. The high integrity processor 30 is configured to analyse the received signals or data to enable an introduced stimulus or its effect to be detected and analysed from each of those components. In addition, or alternatively, any resultant optical effects relating to the injected stimulus may be detected by the optical detector 36. The characteristics of a non-optical stimulus will be discussed in more detail below.

The optical and non-optical signals or data are intended to introduce a known and detectable stimulus into selected components at the input stages of the display system. The introduced stimuli may then be detected at selected components relating to outputs from the display system to reveal any one or more of the different types of potential failure.

An existing source of noise in the NVC 10 or in other components of the display system, may also be considered an example of an introduced stimulus, the effects of which may be detected in images being displayed or in data being processed by the display image processor/driver 16 or by the image projector 18. The noise may provide a randomly varying stimulus to selected pixels, recognisable for example by fluctuations in the lowest significant bits of image data controlling pixel brightness. The effects of the noise on the selected pixels can be used to determine if the stimulus exceeds the expected noise level for the system at a point of monitoring. For example this could be detected non-optically by the high integrity processor 30 utilising an appropriate threshold to determine whether a frozen display has been detected. The threshold and any filtering used on the data must be appropriately set to ensure fluctuations in noise do not allow a fault to remain undetected or the system to detect faults incorrectly.

The example display system shown in FIG. 1 is a helmet-mounted display system. However, as would be apparent to a notional skilled person in the relevant art, the integrity monitoring arrangement may be applied to other types of display system, including head-up displays (HUDs), head-down displays (HDDs) or other forms of head-mounted display. Different display systems provided different opportunities to inject optical or non-optical stimuli at input-related stages of the display system and to detect the effects of the stimuli at output-related stages of the display system. In all cases the intention is to avoid disturbing a user's normal viewing of images, as will now be discussed, additionally with reference to FIG. 2.

Figure 2A:
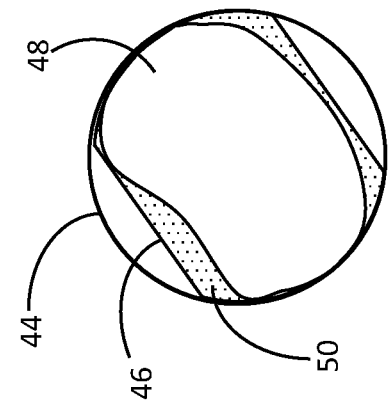
FIG. 2 shows how example image areas of input sensors may relate to image areas of display screens, according to an example disclosed herein.

Referring firstly to FIG. 2a, an example representation is shown of a substantially rectangular active sensor area 40 of a sensor in the NVC 10.

Figure 2B:
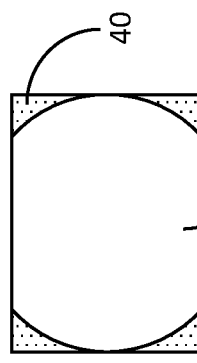

Referring to FIG. 2b, an example representation is shown, overlain on the active sensor area 40, of that portion of the active sensor area 40 that may receive light from a field of view 42 of the NVC 10 of an external scene 12. The field of view is constrained, for example, by a lens system of the NVC 10. Considering the integrity arrangement 1 of the present disclosure, any optical stimulus injected through the lens system of the NVC 10 will necessarily arrive at the sensor somewhere within that part 42 representing the field of view of the NVC 10. However, injection of an optical stimulus from a point between the lens system and the sensor of the NVC 10, as mentioned above, provides an opportunity to inject light into the area 40 that is outside the region 42.

Figure 2C:
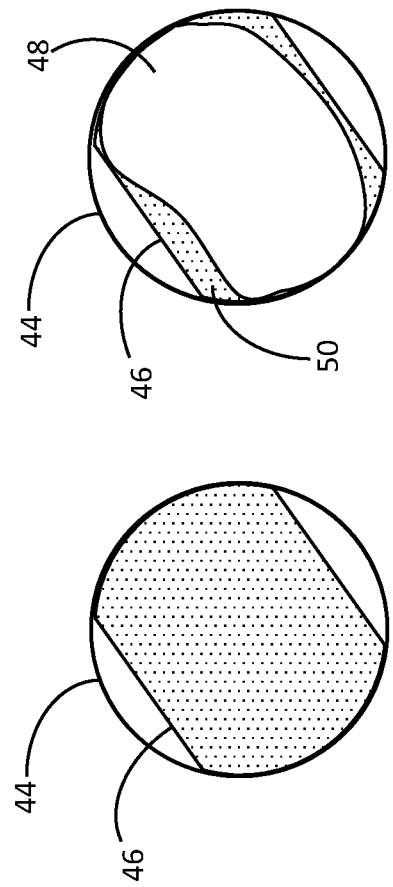

Referring to FIG. 2c, an example representation is shown of a screen area 44 within the image projector 18 or within the image projector of another type of display such as a HUD, at which a collimated image may be formed.

Figure 2D:
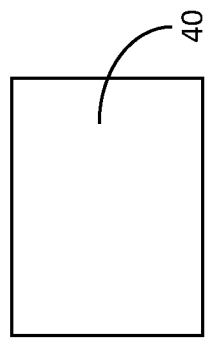

Referring to FIG. 2d, an example representation is shown, overlain upon the screen area 44, of the area within the screen that may receive light output from the active image area 46 of the display device in the image projector 18.

Figure 2E:
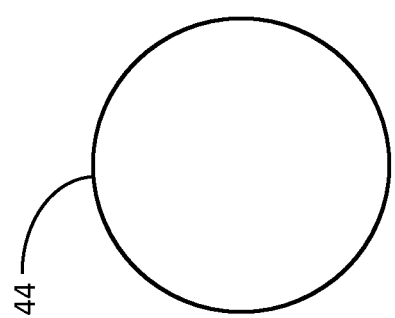

Referring to FIG. 2e, an example representation is shown, overlain upon the area 46 of the screen 44, of an image area 48 that would be seen by a user 22 when viewing a projected image reflected from the visor 20. The area 48 represents the field of view available to a user 22 of light emitted by the display device. That is, the user 22 is able to see that part of an image formed on the screen 44 that lies within the area 48. The field of view 48 visible to the user is determined by the combination of projection optics of the image projector 18 and the visor 20.

Helmet-mounted displays, such as that shown in FIG. 1, employ curved visors 20. In order for light from the image projector 18 to appear undistorted after reflection from the curved visor 20, the image light output by the display device is pre-distorted by the display image processor/driver 16 to compensate for the known optical properties of the visor 20 and any other optics of the image projector 18. Therefore, with appropriate pre-distortion, a full undistorted image will be seen by the user 22 if the pre-distorted image is output from that portion 48 of the screen area 44 that represents the users field of view in the image projector 18.

It may be arranged that any light received at the NVC 10 from the field of view 42 of an external scene 12 may be sensed by the NVC sensor as an image which may be conveyed in data through the system and be displayed from within the area 48 of the screen 44. However, as can be seen in FIG. 2e, there remains a region 50 of the screen 44 that falls outside of the area 48 representing the field of view available to the user 22. Light from that part of an image formed on the screen 44 in the region 50 cannot be seen by the user 22, but may be captured by an appropriately placed optical fibre 38 for example, as shown in FIG. 1. It is therefore preferable, though not essential, for the optical injection source 32 to inject an optical stimulus into the NVC 10 at such a position within the sensing area of the NVC sensor that it is detectable in an image formed on the screen 44 within the region 50. This property may be exploited by the integrity arrangement 1 to test the operational integrity of the display system without disturbing the user's normal use of the display system.

To avoid the need for high precision physical alignment of an optical injection source 32 and optical detector 36 the system may predetermine the positioning of each optical injection source 32 and/or optical detector 36 such that the high integrity processor 30 may use this information to determine actual position of these. The high integrity processor 30 may then check for the actual positions of the optical injection source 32 and generate revised non-optical injection source(s) by copying the associated detected pixel areas of the injection source(s) or alternatively generate completely new non-optical injection source(s) to correctly align with the optical detector 36.

In the system shown in FIG. 1, one example technique was shown and discussed above with reference to FIG. 2e for injecting an optical stimulus into the NVC 10 using an appropriately positioned optical fibre 34. However, other techniques may be used to inject an optical stimulus into the NVC 10.

For example, the optical stimulus may be directed to a particular position within a sensor area of the NVC 10 by one or more of:

injection of a collimated light source through the NVC lens system, for example by means of one or more small optics mounted externally to the NVC lens system;

injection directly onto a selected position on the NVC sensor by means of a fibre optic coupling, bypassing some or all elements of the NVC lens system;

injection using a waveguide placed outside the NVC lens system to provide a collimated image of one or more test points, appropriately positioned;

injection using a waveguide placed internally to the NVC lens system (within the stop) to provide a collimated image of one or more test points, appropriately located.

To exploit the property discussed above with reference to FIG. 2e using an optical stimulus, in one example, one or more optical fibres are placed within the NVC 10 at positions that enable an optical stimulus to be injected at one or more regions close to an edge of the sensing area of the sensor. Alternatively, a substantially transparent optical waveguide may be placed internally to the NVC lens system and an optical stimulus in the form of a collimated image of a test pattern may be injected by the waveguide into the sensor of the NVC 10. The optical waveguide is provided with a diffraction grating formed on or within the waveguide to couple light out of the waveguide towards the sensor. An example positioning of the optical stimulus will now be described with reference to FIG. 3.

Referring to FIG. 3a, in one example, the optical stimulus may comprise one or more markers 60, 62, 64, 66 comprising shapes of light. Each marker 60-66 may be positioned so as to be sensed by the NVC sensor at a position near to an edge of the active sensor area 40 but outside of the usual field of view 42 of the NVC 10.

Referring to FIG. 3b, the region 50 of the screen 44 in the image projector 18 provides an area in which one or more markers 70, 72, 74, 76 may be displayed and detected. Such markers may be injected as a non-optical stimulus earlier in the system or they may be the result of an optical stimulus injected at the NVC 10, for example one or more of the markers 60-66 may be positioned to result in a corresponding marker 70-76 being displayed within the region 50. Any of these four markers 70-76 may be detected by the integrity arrangement 1 using, for example, respectively positioned optical fibres 36 as will now be described with additional reference to FIG. 4 and to FIG. 5.

Referring additionally to FIG. 4, there is shown schematically a sectional view of an example set of components of an image projector 18 for a helmet-mounted colour display. The components comprise a display device 80 arranged to output image-bearing light and to direct the light through an optical system including a lens arrangement 82 to a fold mirror 86 where the light is redirected through a final optic 88 to form an image on a screen 44. The image formed on the screen 44 may then be projected via the visor 20 to the user 22.

Referring to FIG. 5, two techniques will now be described for capturing light from the region 50 of the screen 44, as discussed above with reference to FIG. 2e.

Figure 5A:
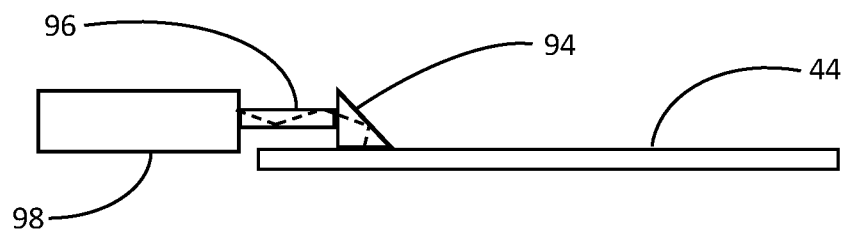
FIG. 5 shows schematically a sectional view of example light capture techniques as applied to a display screen of an image projector, according to an example disclosed herein.

Referring firstly to FIG. 5a, an example schematic sectional view is provided of the screen 44 to which a prism 94 is optically coupled at an edge of the screen 44 corresponding to a region 50, as shown in FIG. 2e, to receive and redirect light through substantially 90° into a section of optical fibre 96. The redirected light propagates through the optical fibre 96 until it reaches an optical detector 98 where the light may be sensed and corresponding sensor data passed to the high integrity processor 30 (not shown in FIG. 5b).

Figure 5B:
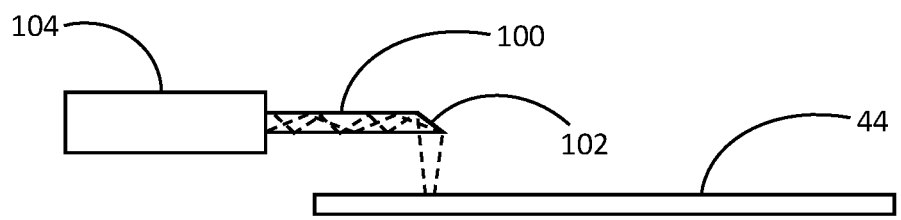

Referring to FIG. 5b, in place of the prism of FIG. 5a, a section of optical fibre 100 is provided having a polished end 102 inclined at substantially 45° to receive light output from the region 50 and to redirect it along the optical fibre 100 to an optical detector 104 similarly linked to the high-integrity processor 30.

As an alternative to the capture of light from the region 50 of the screen 44 using optical fibres as shown in FIG. 5, a waveguide may be used as will now be described with reference to FIG. 6.

Figure 6:
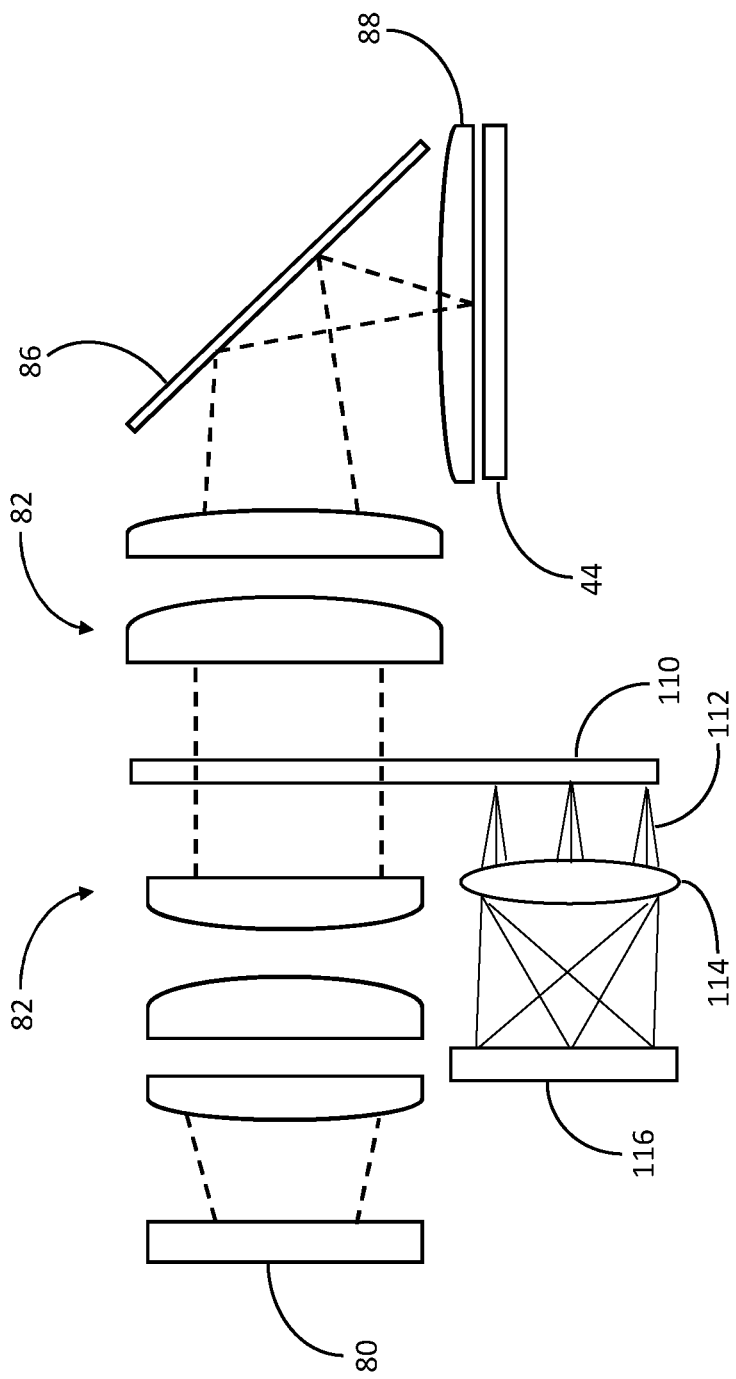
FIG. 6 shows schematically a sectional view of components of an example image projector for a helmet-mounted display, as in FIG. 4, incorporating an alternative light capture technique, according to an example disclosed herein.

Referring to FIG. 6, there is shown schematically a sectional view of the example set of components of an image projector 18 for a helmet-mounted colour display as in FIG. 4. A substantially transparent optical waveguide 110 is inserted within the image projector 18 at a position where the image is substantially collimated. The waveguide 110 is provided with a coating, for example a diffraction grating (not shown in FIG. 6), arranged to cause a small proportion of the collimated light to be coupled into the waveguide 110 at a sufficiently angle for the light to be captured and to propagate along the waveguide 110 by total internal reflection. The propagating light reaches an output element (not shown in FIG. 6), for example another diffraction grating, arranged to couple propagating light out of the waveguide 110 and to pass the light 112 through an optic 114 to an optical image sensor 116. Image data from the optical sensor 116 may be passed to the high-integrity processor 30 for analysis, in particular to recognise those portions of the sensed image corresponding to the optical or non-optical stimulus injected earlier in the system.

As mentioned above, it is not necessary for the physical positions at which light is being detected at the screen 44 or injected at an image sensor of the NVC 10 or to be precisely known. In an example method, as will now be described, the alignment of an injected optical stimulus with one or more detecting positions at the screen 44 may be made in data by the high-integrity processor 30.

In the arrangement described above with reference to FIG. 1 and FIG. 3a, optical fibres 34 may be positioned to inject light into an image sensor of the NVC 10 at one or more positions, for example of the markers 60-66. The positions of the markers 60-66 are either pre-determined during a manufacturing/calibration process or dynamically during initialisation of the system using methods apparent to a person of reasonable technical skills. Once determined these positions are used as the references for where the injected light should occur in a correctly operating system.

In the arrangement described above with reference to FIG. 1 and FIG. 5, optical fibres 38 are arranged to couple light from one or more fixed positions around a perimeter of the screen 44. The positions of the optical detectors are either pre-determined during a manufacturing/calibration process or dynamically during initialisation of the system using methods apparent to a person of reasonable technical skills. Once determined these are used as the reference positions for where the optical detector will measure a light stimulus.

Having established the position in data of an optical stimulus and/or the position in data of a point at which light is coupled from the screen 44, the high-integrity processor 30 is able to redirect, in data, the effect of an optical stimulus from a determined position at an image sensor to a corresponding determined position on the screen 44. If the only stimulus to be applied in the display system is a non-optical stimulus, then the redirection functionality of the high-integrity processor 30 is not required.

As was mentioned above, the integrity monitoring arrangement 1 may be applied to other types of display system, such as a HUD, as will now be discussed briefly with reference to FIG. 7.

Referring to FIG. 7, there is shown schematically a sectional view through a HUD having an image projector 120 contained in a housing 122. The image projector 120 incorporates a screen 124, equivalent in purpose to the screen 44 of the image projector 18 for the helmet-mounted display. An image formed on the screen 124 of the HUD is projected through a window 126 towards a combiner 128 inclined at approximately 45° to the plane of the window 126 to redirect the projected image towards a user 130.

The different techniques described above with reference to FIGS. 2, 3, 5 and 6, as applied to the image projector 18 of a helmet-mounted display for the sensing of light at positions of an image formed on the screen 44, may be applied, in principle, to the sensing of light at equivalent positions on the screen 124 in the image projector 120 of a HUD.

While the optical detection of a displayed result of injecting an optical stimulus exercises all the components of a display system involved in the display of images, the high integrity processor 30 may also be arranged to receive and analyse image data, for example, from the display image processor/driver 16 or from the image projector 18. The received image data include information about the state of pixels in that region of a final intended image including the result of any injected stimulus. As such, the image data may be analysed by the high-integrity processor 30 to look for evidence of failure requiring action.

Example techniques have been described above for injecting an optical or non-optical stimulus into a display system and for detecting the result of the injected stimulus at an image projector 18 of a helmet-mounted display.

However, the optical or non-optical stimulus injected under the control of the high integrity processor 30 may have different characteristics according to the type of system failure or hazard to be detected. Similarly, the analysis performed by the high integrity processor 30 of optically detected or non-optically detected effects of the injected stimulus will be different for each type of display system failure or potential hazard. Some example stimulus characteristics and analysis techniques will now be described for an example range of different types of display system failure or hazard.

(1) Frozen Display

A 'frozen display' occurs when the display fails to refresh and so display changing image content. To detect this event, the high integrity processor 30 triggers the injection of an optical stimulus comprising, for example, the arrangement of markers 60-66 shown in FIG. 3a. The high integrity processor 30 then analyses an optically-detected response to ensure that the display system displays the result of the stimulus within a predetermined time period, e.g. within two display frame periods of 20 ms. A shorter period may be set if the integrity system is synchronised to the frame periods of the display system.

In an alternative technique, an existing stimulus in the form of noise arising in the NVC 10 may be exploited to detect corresponding small-scale fluctuations in pixel brightness over a sample of pixels from the display. For example, the markers 60-66 are each arranged to affect a block of pixels of at least a predetermined size so that the sample of pixels represented by the markers 60-66 provides a sufficiently large sample of pixels of the display to detect a frozen display. Small changes in pixel brightness in an image 70-76 formed of the markers 60-66 over two or more frame periods of, e.g. 20 ms, may be distinguishable in data output from the optical detector 36 in the arrangement shown in FIG. 1, by the detectors 98 or 104 in FIG. 5 or by the detector 114 in the arrangement shown in FIG. 6. Alternatively, the high integrity processor 30 may receive image data e.g. from the display image processor/driver 16 or from the image projector 18 and look for changes to the lowest significant bits in image data for displayed markers 70-76 over the same time periods.

(2) Image Scaling Errors

Symptoms of image scaling errors may include the display of an image of the external scene 12 at a different to usual size such that any symbols overlain by the symbol generator 24 upon features in that displayed image would appear misplaced. The high integrity processor 30 may detect an image scaling error by triggering the injection of a stimulus comprising two or more markers of known separation, such as those markers 60-66 in FIG. 3a, and detecting the light levels or other characteristic expected from correctly positioned images 70-76 of those markers on the screen 44. An incorrectly positioned marker due to a scaling error will result in a different sensed light level or characteristic at each position as compared with that of a correctly positioned marker.

During a calibration phase for the integrity system, the position of the markers 60-66 in an optical stimulus or in a non-optical stimulus, may be adjusted so that they are aligned, for example, to the positions of the optical couplers 94, 102 as shown in FIG. 5 and the detectable characteristics established. Any positioning error would then be evident from the sensing of different characteristics at the positions of the optical couplers 94, 102.

Detection of an image scaling error may for example be performed using the same injected stimulus as used for the detection of a frozen display in (1) above.

(3) Image Oscillation

Image oscillation may be characterised by unintended oscillatory changes in pixel brightness (on/off), greyscale level, pixel colour or position. Any of these symptoms may be detected by the high integrity processor 30 by analysing the sensed characteristics of light detected at the positions of the couplers 94, 102, for example, intended to result from an injected stimulus comprising the markers 60-66 of FIG. 3a for example. The markers 60-66 may be fixed in position, colour and brightness over a time period of several frame periods e.g. of 20 ms, to enable evidence of image oscillation to be detected.

(4) Positioning Errors

Positioning errors are characterised by the display of image elements in unintended positions. As for the detection of scaling errors, sensed differences in the characteristics of light at the positions expected at the screen 44 for correctly positioned images 70-76 of the markers 60-66, for example, as determined during a calibration phase, provide evidence of positioning errors. Actual displayed positions of the markers 70-76 may be determined by analysis of image data from an image sensor 116 in the arrangement described above with reference to FIG. 6.

(5) Image Brightness Faults

Image brightness faults may be characterised by absolute brightness errors or relative brightness errors arising in different parts of the image area of the display. Image brightness errors may be detected by injecting a stimulus comprising one or more markers, e.g. the markers 60-66, of known brightness, or of known relative brightness, and comparing the detected displayed brightness or relative brightness of the markers 70-76, as they appear in an image formed at the screen 44, with that or those expected.

(6) Failure of One or More of a Red, Green or Blue LED in a Colour Display

Each of the red, green and blue LEDs in the image projector 18 for a colour display may be tested by the high integrity processor 30 by triggering injection of one or more stimuli, whether optical or non-optical, defining one or more red, green and blue markers and receiving information from the image projector 18 on which LEDs are being driven. Alternatively, the optical detector 36 may comprise an arrangement of colour filters with separate detectors for detecting the brightness of the light passing through each colour filter to identify whether any one of the red, green or blue LEDs has failed.

(7) Symbology Integrity

Integrity of symbols generated by the symbol generator 24 may also be monitored. In one example technique, the symbol generator 24 may be configured to include one or more 'integrity symbols' in its symbol set and to generate an integrity symbol at a predetermined position in an image area of the symbol generator. In practice an 'integrity symbol' comprises no more than a solid shape of light, as for example one of the marker 60-66 shown in FIG. 3a. During a configuration stage of the integrity monitoring arrangement 1, the predetermined position for placing the generated integrity symbol may be determined to result in display of a corresponding symbol where light is detectable at the screen 44. Alternatively, a similar method may be applied by the high-integrity processor 30 to detect a position in data of an integrity symbol generated by the symbol generator 24 and to redirect the integrity symbol in data such that it is displayed in the region 50 at a position of detecting light at the screen 44.

Other examples of display system failure or potentially hazardous display system problem may be detected under the control of the high integrity processor 30, as would be apparent to a person of ordinary skill in the relevant art. Each may be detected by injecting an appropriately constructed optical or non-optical stimulus and detecting a displayed, or to be displayed, result of that stimulus. Such examples are intended to fall within the scope of the present invention.

The high integrity processor 30 may be implemented using a conventional digital processor arranged to execute a computer program causing the digital processor to implement the integrity monitoring functionality described above. Alternatively, or in addition, functionality of the high integrity processor 30 may be implemented using one or more configurable hardware logic devices or a combination of one or more configurable hardware logic devices and a digital processor executing a computer program.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. An integrity monitor for a display system, the display system including an image source and a display, the integrity monitor comprising:
   a controller configured to
     analyse sensed characteristics at one or more predetermined positions in an image output of the display, and
     relate the sensed characteristics to predetermined characteristics of a stimulus injected into the image source, thereby to determine the presence of a fault in the display system.

2. The integrity monitor according to claim 1, wherein the stimulus comprises an optical stimulus having the predetermined characteristics for injection into an optical sensor of the display system.

3. The integrity monitor according to claim 2, comprising an optical injection source configured to generate the optical stimulus, the optical stimulus comprising light having the predetermined characteristics of wavelength, brightness and duration.

4. The integrity monitor according to claim 3, wherein the optical injection source is controllable by the controller.

5. The integrity monitor according to claim 3, comprising one or more optical fibres for channelling light from the optical injection source to one or more positions in an image sensing area of the optical sensor.

6. The integrity monitor according to claim 3, comprising an optical waveguide positioned to output light including the optical stimulus to the optical sensor.

7. The integrity monitor according to claim 1, wherein the display system comprises a generator of symbols for display.

8. The integrity monitor according to claim 7, wherein the stimulus comprises one or more symbols provided by the generator of symbols, each symbol at a predetermined position within an image area of the display system.

9. The integrity monitor according to claim 1, wherein the stimulus comprises a manipulation of data representing an image area of the display system.

10. The integrity monitor according to claim 1, wherein the stimulus comprises an inherent noise component, generated by a component of the display system, the inherent noise component in data representing an image area of the display system.

11. The integrity monitor according to claim 1, comprising an optical detector for sensing the sensed characteristics of light emitted at the one or more predetermined positions in an optical output of the display and for outputting data indicative of the sensed characteristics to the controller.

12. The integrity monitor according to claim 11, comprising one or more optical fibres for channeling the light emitted at the one or more predetermined positions in the optical output of the display to the optical detector, wherein the one or more predetermined positions are outside of a field of view to a user of light emitted by the display.

13. The integrity monitor according to claim 11, comprising an optical waveguide positioned within an image projector of the display, the optical waveguide configured to capture a portion of collimated light in an image area of the display system and to channel the captured light to an image sensor, thereby to provide image data to the controller for analysis.

14. The integrity monitor according to claim 11, wherein the controller is configured to identify, from sensed changes to the light emitted from the one or more predetermined positions in an image area of the display system over a predetermined time period, whether the display system has frozen or whether image elements being displayed are subject to an undesirable oscillation.

15. The integrity monitor according to claim 11, wherein the controller is configured to receive data representing an image area of the display system and to determine a position, represented in said data, corresponding to one or more predetermined positions in the image area of the display system such that a stimulus comprising a manipulation of said data for said determined position is expected to result in a change in sensed characteristics at the one or more predetermined positions in the image area of the display system.

16. The integrity monitor according to claim 5, wherein the controller is configured to: receive data representing an image area of the display system; and determine a position, represented in said data, corresponding to the one or more positions in the image sensing area of the optical sensor at which an optical stimulus is configured to be injected.

17. The integrity monitor according to claim 15, wherein the controller is configured to inject the stimulus or to redirect an injected stimulus by a manipulation of data representing the image area of the display system such that the injected stimulus is expected to result in a change in sensed characteristics at the one or more predetermined positions in the image area of the display system.

18. The integrity monitor according to claim 1, wherein the display is arranged to display colour or multiple wavelength images and the controller is configured to determine from expected colour or wavelength characteristics of an injected stimulus sensed at one or more predetermined positions in an image area of the display system whether there has been a failure of an LED in an image projector of the display system.

19. The integrity monitor according to claim 1, wherein the display comprises one or more of a head or helmet-mounted display, a head-up display or a head-down display.

20. A method for monitoring integrity of a display system, the display system including an image source and a display, the method comprising:
- injecting a stimulus into the image source;
- analysing sensed characteristics at one or more predetermined positions in an image output of the display; and
- relating the sensed characteristics to predetermined characteristics of the stimulus injected into the image source, thereby to determine the presence of a fault in the display system.

* * * * *